US010698665B2

(12) United States Patent
Hwang et al.

(10) Patent No.: US 10,698,665 B2
(45) Date of Patent: Jun. 30, 2020

(54) METHOD FOR SUPPORTING DEVELOPMENT OF USER INTERFACE FOR APPLICATION IN GUI ENVIRONMENT AND SERVER USING THE SAME

(71) Applicant: TMAXSOFT. CO., LTD., Gyeonggi-do (KR)

(72) Inventors: Jong Yun Hwang, Gyeonggi-do (KR); Ji Won Kim, Seoul (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 396 days.

(21) Appl. No.: 15/657,414

(22) Filed: Jul. 24, 2017

(65) Prior Publication Data
US 2018/0024819 A1 Jan. 25, 2018

(30) Foreign Application Priority Data
Jul. 25, 2016 (KR) .......................... 10-2016-0094412

(51) Int. Cl.
*G06F 8/34* (2018.01)
*G06F 8/38* (2018.01)

(52) U.S. Cl.
CPC . *G06F 8/38* (2013.01); *G06F 8/34* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,949,998 A * | 9/1999 | Fowlow | ..................... | G06F 8/34 717/103 |
| 6,581,203 B1 * | 6/2003 | Nguyen | ..................... | G06F 8/34 717/106 |
| 9,274,764 B2 * | 3/2016 | Jaramillo | .................. | G06F 8/38 |
| 2008/0046863 A1 * | 2/2008 | Vitkin | ....................... | G06F 8/34 717/105 |
| 2009/0320002 A1 * | 12/2009 | Peri-Glass | ................ | G06F 8/38 717/131 |
| 2010/0131857 A1 * | 5/2010 | Prigge | ........................ | G06F 8/10 715/744 |

(Continued)

FOREIGN PATENT DOCUMENTS

EP             622729 A2    11/1994
KR    1020150092880 A    8/2015

*Primary Examiner* — Hien L Duong
(74) *Attorney, Agent, or Firm* — Husch Blackwell LLP

(57) ABSTRACT

A method for supporting UI development of an application in a graphical user interface environment is provided. The method includes steps of: (a) a server, if an intention of a user to start editing an action which is a set of UI changes is detected through GUI environment, acquiring a previous state of the UI model, wherein the previous state is a state before editing the action; and (b) the server, if an intention of the user to finish editing the action is detected through the GUI environment, comparing a changed state of the UI model with the previous state thereof to acquire a comparison result, where information on the action having been completely edited is reflected on the previous state of the UI model to acquire the changed state thereof; and recording the information on the action having been completely edited by referring to the comparison result.

18 Claims, 13 Drawing Sheets

(56) References Cited

U.S. PATENT DOCUMENTS

| | | | |
|---|---|---|---|
| 2010/0145966 A1* | 6/2010 | Morton | G06F 8/36 |
| | | | 707/758 |
| 2012/0047130 A1* | 2/2012 | Perez | G06F 8/34 |
| | | | 707/723 |
| 2012/0096072 A1* | 4/2012 | So | G06F 9/542 |
| | | | 709/203 |
| 2013/0167110 A1* | 6/2013 | Gross | G06F 8/38 |
| | | | 717/105 |
| 2017/0046235 A1* | 2/2017 | Straub | G06F 11/1474 |

* cited by examiner

METHOD FOR SUPPORTING DEVELOPMENT OF USER INTERFACE FOR APPLICATION IN GUI ENVIRONMENT AND SERVER USING THE SAME

CROSS-REFERENCE TO RELATED APPLICATIONS

This application claims priority to and incorporates herein by reference all disclosure in Korean patent application no. 10-2016-0094412 filed Jul. 25, 2016

FIELD OF THE INVENTION

The present invention relates to a method for allowing a developer to easily develop user interface of an application using GUI environment and a server using the same, and more particularly, to the method for (i) acquiring a previous state of a UI model if an intention of a user to start editing an action which is a set of UI changes is detected through the GUI environment, wherein the previous state is a state before editing the action, (ii) comparing a changed state of the UI model with the previous state thereof to thereby acquire a comparison result if an intention of the user to finish editing the action is detected through the GUI environment, where information on the action having been completely edited is reflected on the previous state of the UI model to thereby acquire the changed state thereof, and recording the action having been completely edited by referring to the comparison result; and the server using the same.

BACKGROUND OF THE INVENTION

To develop an application, a variety of programming skills and expertise are required, particularly for understanding environments in which the application is developed and executed. For the convenience of developing applications with a degree of high difficulty, a variety of methods have been proposed. For example, there are frameworks which make it easy to develop such applications and there are development tools that facilitate development of the applications by easing coding tasks.

Said conventional development tools have provided GUI environment to develop the applications, and most of such development tools generally provide a functionality of editing a UI configuration within the GUI environment. One example of said GUI environment provided by one of the conventional development tools is illustrated in FIG. 13. When developers intend to dynamically change states of UIs during runtime in such a GUI environment for the development of applications, it is inevitable for the developers to write code logics of the applications therefor or to write codes with respect to definitions of UI changes of the applications. It may mean that only predetermined layouts and configurations of the UIs may be rendered. If the developers want to change the UIs or its related attribute values during runtime, it used to be possible for the developers to write codes by only using APIs. There are a variety of platforms and a lot of frameworks exist and run on said platforms. To be familiar with so many platforms and frameworks for developing the applications costs the developers a lot of efforts and expenses.

Accordingly, the present invention proposes a method for supporting a developer to develop UIs of an application, specifically, by making it possible (i) to define changes of the UIs during runtime by recording and analyzing the changes of the Ins that the developer made through a GUI environment, (ii) to provide the effectiveness and convenience by reducing repetitive tasks during a course of the development through modularizing the changes of the UIs as an action component and allowing said component to be reused, and (iii) to save costs for developing the whole application therethrough.

SUMMARY OF THE INVENTION

It is an object of the present invention to solve all problems explained above.

It is another object of the present invention to allow a developer to easily define UI elements and their changes during runtime by replacing a conventional complicated and inconvenient way of implementing UIs through writing codes with a way of developing the UIs in a graphical user interface environment, and thus improving intuitiveness of UI development.

It is still another object of the present invention to reduce a developer's repetitive tasks of applying UI changes to UI elements by defining and modularizing changes of UI elements during runtime as an action component, and thus allowing the changes to be easily applied to other UI elements.

It is still yet another object of the present invention to promote division of tasks in application development by separating one of the tasks that is designing functions of UI elements from another one of the tasks that is composing remaining code logics of an application.

In accordance with one embodiment of the present invention, there is provided a method for supporting UI development of an application in a graphical user interface environment, where a UI model includes at least one of UI elements and the UI elements are at least part of widgets or layouts, including steps of: (a) a server, if an intention of a user to start editing an action which is a set of UI changes is detected through the GUI environment, acquiring or instructing other devices to acquire a previous state of the UI model, wherein the previous state is a state before editing the action; and (b) the server, if an intention of the user to finish editing the action is detected through the GUI environment, comparing or instructing other devices to compare a changed state of the UI model with the previous state thereof to thereby acquire a comparison result, where information on the action having been completely edited is reflected on the previous state of the UI model to thereby acquire the changed state thereof and recording or instructing other device to record the information on the action having been completely edited by referring to the comparison result, wherein the UI changes include creation or deletion of the UI elements and changes of attribute values thereof.

In accordance with another embodiment of the present invention, there is provided a method for supporting UI development of an application in a graphical user interface environment, where a UI model includes at least one of UI elements and the UI elements are at least part of widgets or layouts, comprising steps of: (a) a server, on the condition that (i) a previous state of the UI model is acquired, wherein the previous state is a state before editing an action which is a set of UI changes; (ii) if an intention of a user to finish editing the action is detected through the GUI environment, a changed state of the UI model is compared with the previous state thereof to thereby acquire a comparison result, where information on the action having been completely edited is reflected on the previous state of the UI model to thereby acquire the changed state thereof; and (iii) the information on the action having been completely edited by referring to the comparison result is recorded; if an intention of the user to bind the recorded action to a specific event or a specific logic capable of being handled through the application is detected through the GUI environment, acquiring or instructing other devices to acquire the recorded action; and (b) the server generating or instructing other devices to generate information on codes by referring to information on the recorded action, wherein the information on codes is information used for implementing functions of the UI model, wherein the UI changes include creation or deletion of the UI elements, and changes of attribute values thereof.

In accordance with still another embodiment of the present invention, there is provided a server for supporting UI development of an application in a graphical user interface environment, where a UI model includes at least one of UI elements and the UI elements are at least part of widgets or layouts, including: a communication part for detecting an intention of a user to start editing an action which is a set of UI changes through the GUI environment; and a processor for (i) acquiring or instructing other devices to acquire a previous state of the UI model, wherein the previous state is a state before editing the action; (ii) if an intention of the user to finish editing the action is detected through the GUI environment, comparing or instructing other devices to compare a changed state of the UI model with the previous state thereof to thereby acquire a comparison result, where information on the action having been completely edited is reflected on the previous state of the UI model to thereby acquire the changed state thereof; and (iii) recording or instructing other devices to record the information on the action having been completely edited by referring to the comparison result, wherein the UI changes include creation or deletion of the UI elements and changes of attribute values thereof.

In accordance with still yet another embodiment of the present invention, there is provided a server for supporting UI development of an application in a graphical user interface environment, where a UI model includes at least one of UI elements and the UI elements are at least part of widgets or layouts, comprising: a communication part for, on the conditions that (i) a previous state of the UI model is acquired, wherein the previous state is a state before editing an action which is a set of UI changes; (ii) if an intention of a user to finish editing the action is detected through the GUI environment, a changed state of the UI model is compared with the previous state thereof to thereby acquire a comparison result where information on the action having been completely edited is reflected on the previous state of the UI model to thereby acquire the changed state thereof; and (iii) the information on the action having been completely edited by referring to the comparison result is recorded, detecting through the GUI environment an intention of the user to bind the recorded action to a specific event or a specific logic capable of being handled through the application; and a processor for acquiring or instructing other devices to acquire the recorded action and generating or instructing other devices to generate information on codes by referring to information on the recorded action, wherein the information on codes is information used for implementing functions of the UI model, wherein the UI changes include creation or deletion of the UI elements, and changes of attribute values thereof.

BRIEF DESCRIPTION OF THE DRAWINGS

The drawings attached below are used to explain exemplary embodiments of the present invention and are only a part of exemplary embodiments of the present invention. Other drawings may be derived from the drawings without incorporating any inventive work for those skilled in the art.

DETAILED DESCRIPTION OF THE PREFERRED EMBODIMENTS

The following detailed description of the present invention refers to the accompanying drawings, which illustrate, by way of example, specific embodiments in which the present invention may be practiced, in order to clarify the objects, technical solutions and advantages of the present invention. These embodiments are described in sufficient detail to enable those skilled in the art to practice the present invention.

In this specification of the present invention, a UI model may indicate whole UIs for an application. Such a UI model may include at least one UI element. The UI element indicates a widget or a layout, that is, refer to an element that constitutes one part of the whole UIs.

Figure 3:
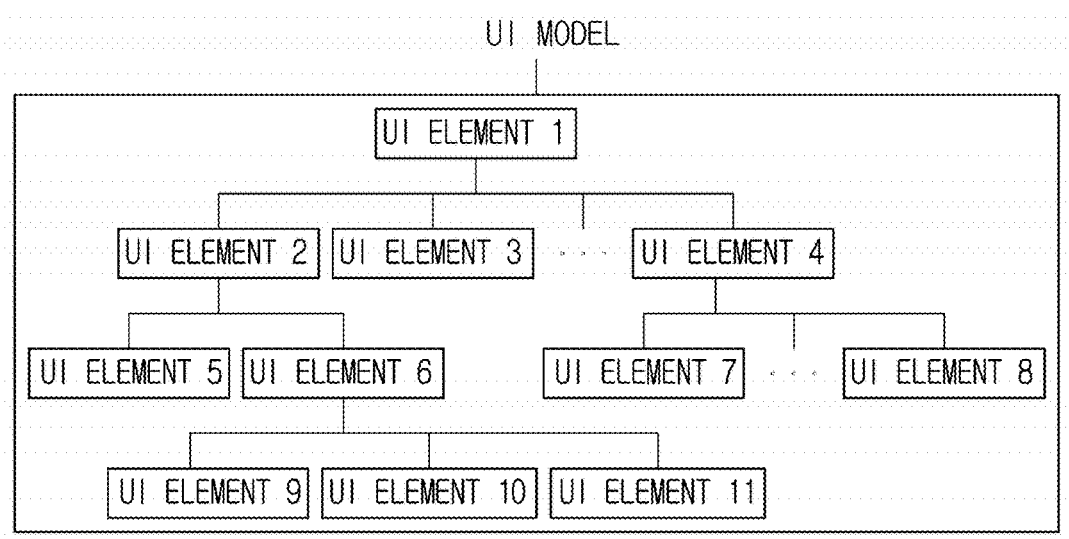
FIG. 3 is a conceptual diagram exemplarily showing a configuration of a UI model that a UI of an application may have in case the UI development of the application is supported in the graphical user interface environment in accordance with the present invention.

FIG. 3 is a conceptual diagram exemplarily showing a configuration of a UI model. Referring to FIG. 3, UI elements 2, 3, 4, etc. are placed under a UI element 1 which is a top-level element in the UI model. Further, UI elements 5 and 6 are disposed under the UI element 2 while UI elements 7, 8, etc. are placed under the UI element 4. UI elements 9, 10, and 11 are disposed under the UI element 6.

Overall, the UI elements are in a tree structure as a whole. In short, a UI element may include another UI element.

Examples of the aforementioned widget may include Listview which is a widget displaying at least one of elements in a form of list; TableView which is a widget displaying at least one of elements in a form of table; SelectBox which is a widget displaying at least one of elements in a form of box to allow a user to select the at least one of elements; TreeView which is a widget displaying elements in a form of tree; Button which is a widget displayed to be pressed by the user; CheckBox which is a widget displayed to allow the user to check whether or not an item corresponding to a box is applicable to the user; Switch which is a widget displayed to allow the user to select ON or OFF of an item; TextField which is a widget displayed to allow the user to input a line of a string; TextArea which is a widget displaying multiple lines of inputted strings; ImageView which is a widget displaying images; ImageButton which is a widget displaying an image as a button to be pressed by the user; ProgressBar which is a widget displaying a degree of progressing for a specific item; RadioButton which is a widget displaying a group of choices and allowing the user to select only one of the choices in the group; Slider which is a widget displayed to allow the user to select one of the continuous or discrete values; TextView which is a widget displaying preset texts or strings; VideoView which is a widget displaying videos; WebView which is a widget displaying webpages; DatePicker which is a widget displaying a calendar to allow the user to select a date; or ToolbarMenu which is a widget displaying pop-up menus from a toolbar, but it may be definitely clear to those skilled in the art that the examples of the widget are not limited thereto.

Besides, examples of the aforementioned layout may include AbsoluteLayout which is a layout where a position of each of the widgets is determined from upper left of the layout by layoutTop and layoutLeft which are individual attribute values of the widgets included in the layouts; LinearLayout which is a layout where each of the widgets included in the layouts is placed in an order of top to bottom or left to right according to an orientation being an attribute value of the layout; DockLayout which is a layout where each of the widgets is arranged with respect to top, left, right, bottom, or center of the layout according to such values as top, left, right, bottom and center acceptable as an attribute value for each of the widgets included in the layouts by layoutAlignParent; GridLayout that is a layout in which the layout is divided into a pattern of checkerboard by attribute values, row and column, of the layouts and where each of the widgets included in the layouts is placed on a selected position in the checkerboard pattern according to attribute values, layoutRow and layoutColumn, of each of the widgets; FrameLayout which is a layout where each of the widgets included in the layouts is placed to be overlapped in a predetermined order; TabLayout which is a layout including at least one tab on the top of the layout and in which each of the widgets is disposed in the layout if the at least one tab corresponding to attribute value layoutTabName of each of the widgets included in the layouts is pressed; ScrollLayout which is a layout displaying a scroll bar if a total dimension summed up by a dimension of each of the widgets included in the layouts is larger than a dimension of the layout; and ConditionalLayout that is a layout in which each of the widgets is displayed in the layout according to information on corresponding order, where the information on corresponding order is a result value of a function binding to layoutSwitchCase which is an attribute value of each of the widgets included in the layouts, but the examples of the layout are not limited thereto.

In the specification of the present invention, UI changes, referring as a term indicating changed states of a UI element, may include creation or deletion of the UI element and changes of attribute values thereof. An action mentioned throughout the specification of the present invention indicates a set of such UI changes.

Besides, throughout the detailed description and the claims of the present invention, a term "include" and its variations are not intended to exclude other technical features, additions, components, or steps. Other certain objects, advantages and features of the present invention may be revealed to those skilled in the art partly from the description and partly from embodiments of the present invention. The embodiments and drawings below are provided as examples and the present invention is not intended to be limited thereof.

Furthermore, the present invention includes all the possible combinations of example embodiments specified in this specification. It is to be appreciated that the various embodiments of the present invention, although different, are not necessarily to be mutually exclusive. For example, a particular feature, structure, or characteristic described herein in connection with one embodiment may be implemented within other embodiments without departing from the spirit and the scope of the present invention. In addition, it is to be appreciated that the position or arrangement of individual elements within each disclosed embodiment may be modified without departing from the spirit and the scope of the present invention. As such, the following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Unless otherwise indicated herein or otherwise clearly contradicted by context, items referred to in the singular are intended to encompass a plurality of items, unless the context otherwise requires. Hereinafter, preferred embodiments of the present invention will be described by referring to accompanying drawings so that those skilled in the art may easily implement the present invention.

Figure 1:
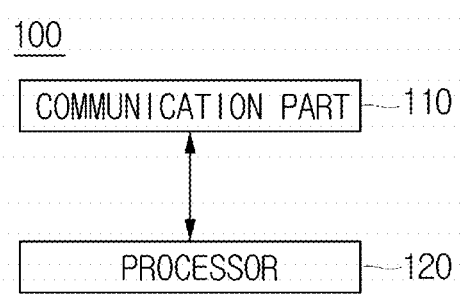
FIG. 1 is a block diagram illustrating a configuration of a server providing a method for supporting UI development of an application in a graphical user interface environment in accordance with one example embodiment of the present invention.

FIG. 1 is a block diagram illustrating a configuration of a server providing a method for supporting UI development of an application in a graphical user interface environment in accordance with one example embodiment of the present invention. Referring to FIG. 1, the server 100 may include a communication part 110 and a processor 120. In addition, such a server may be connected with at least one of developers' terminals through a network.

Specifically, the communication part 110 may detect an intention of a user, i.e., a developer, to start editing an action through the graphical user interface environment that is provided to the developer's terminal. For example, such a communication part may be a network interface controller or NIC, but it is not limited thereto. It may include a keyboard, a mouse, or other external input devices widely used to receive the user's input.

Further, the processor 120 may acquire or support another device to acquire a previous state of the UI model, i.e., a state thereof before the action is edited. In addition, if an intention of the user to finish editing the action is detected through the GUI environment provided to the developer's terminal, the processor 120 may perform a function of executing the method for supporting UI development of the application in accordance with the present invention by comparing or supporting another device to compare a changed state of the UI model with the previous state thereof to acquire a comparison result and then by recording or supporting another device to record the action having been completely edited by referring to the comparison result. Herein, information on the action having been completely edited is reflected on the previous state of the UI model to thereby acquire the changed state thereof.

Figure 2:
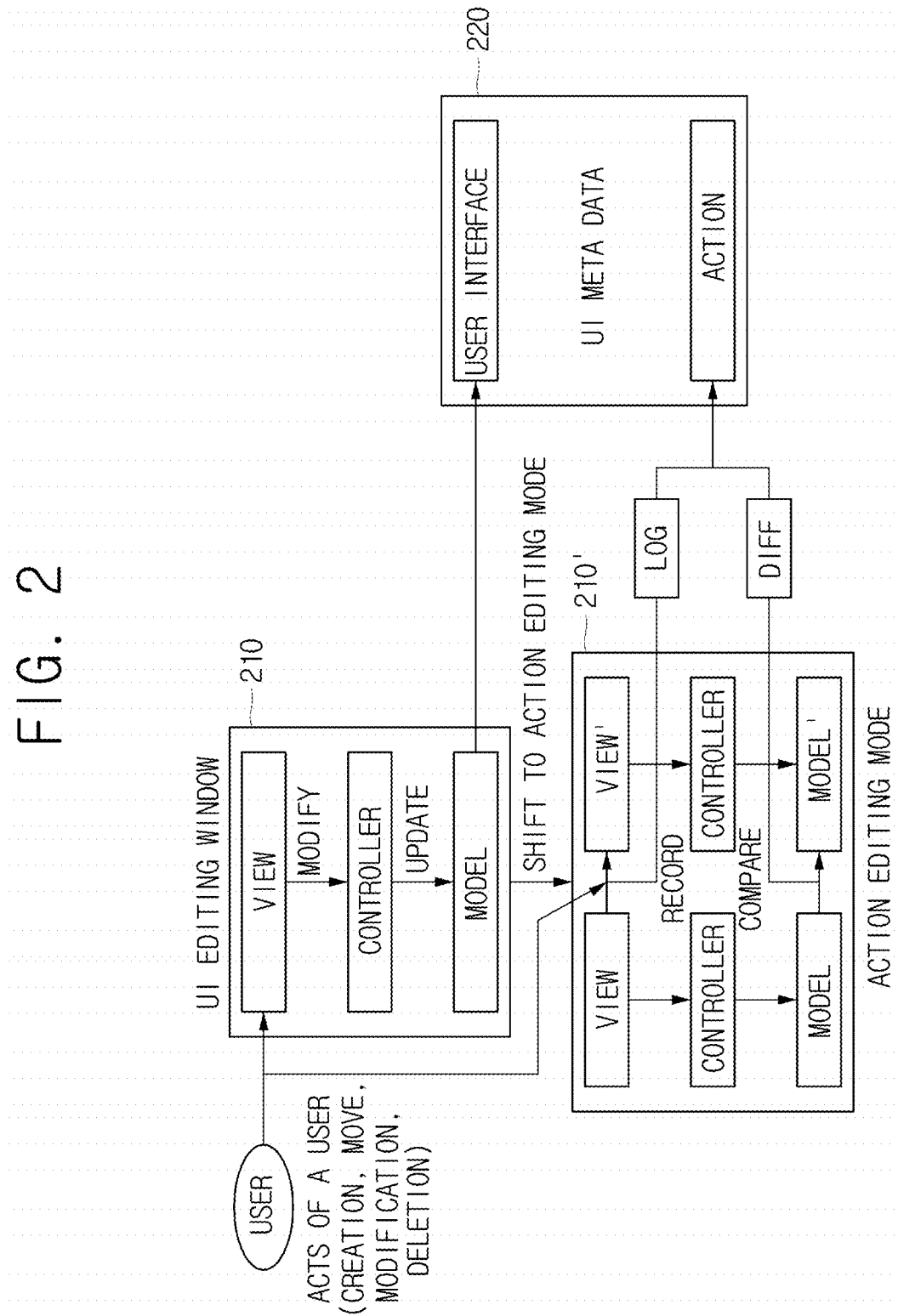
FIG. 2 is a conceptual diagram exemplarily illustrating software architecture of the server providing the method for supporting UI development of the application in the graphical user interface environment in accordance with one example embodiment of the present invention.

FIG. 2 is a conceptual diagram exemplarily illustrating software architecture of the server providing the method for supporting UI development of an application in a graphical user interface environment in accordance with one example embodiment of the present invention.

Referring to FIG. 2, an architecture of an MVC, i.e., a model-view-controller, corresponding to an appearance and a function of a UI editing window 210 is illustrated on an upper portion of FIG. 2. The MVC architecture is a software design pattern and detailed description of MVC will be omitted due to the contents thereof are well known to those of ordinary skill in the art.

In FIG. 2, if the user edits UIs through the UI editing window 210 before the action is edited, information on the UIs is contained in UI metadata 220. Then, if the user carries out an operation to shift to an action editing mode 210', a state of the MVC architecture before any edition in the action editing mode 210' is acquired. If the user changes a view through the user's acts in the action editing mode 210', a controller that has detected the changes of the view updates a model so as to make the model be corresponding to the changed view. In detail, the changes of the UI elements due to the user's acts may include creation, move, modifications of attribute values, or deletion of the UI elements.

Now, if the user conducts an operation to finish the action editing mode, the state of the MVC architecture that has been changed so far is compared with that of the MVC architecture that has been already acquired. Then, according to the comparison result, an action is defined. Information on the action along with the information on the aforementioned UIs is contained in the UI metadata 220. Herein, the UI metadata 220 are information for implementing functions of the UI model and may be referred to as information on codes as well.

Figure 6:
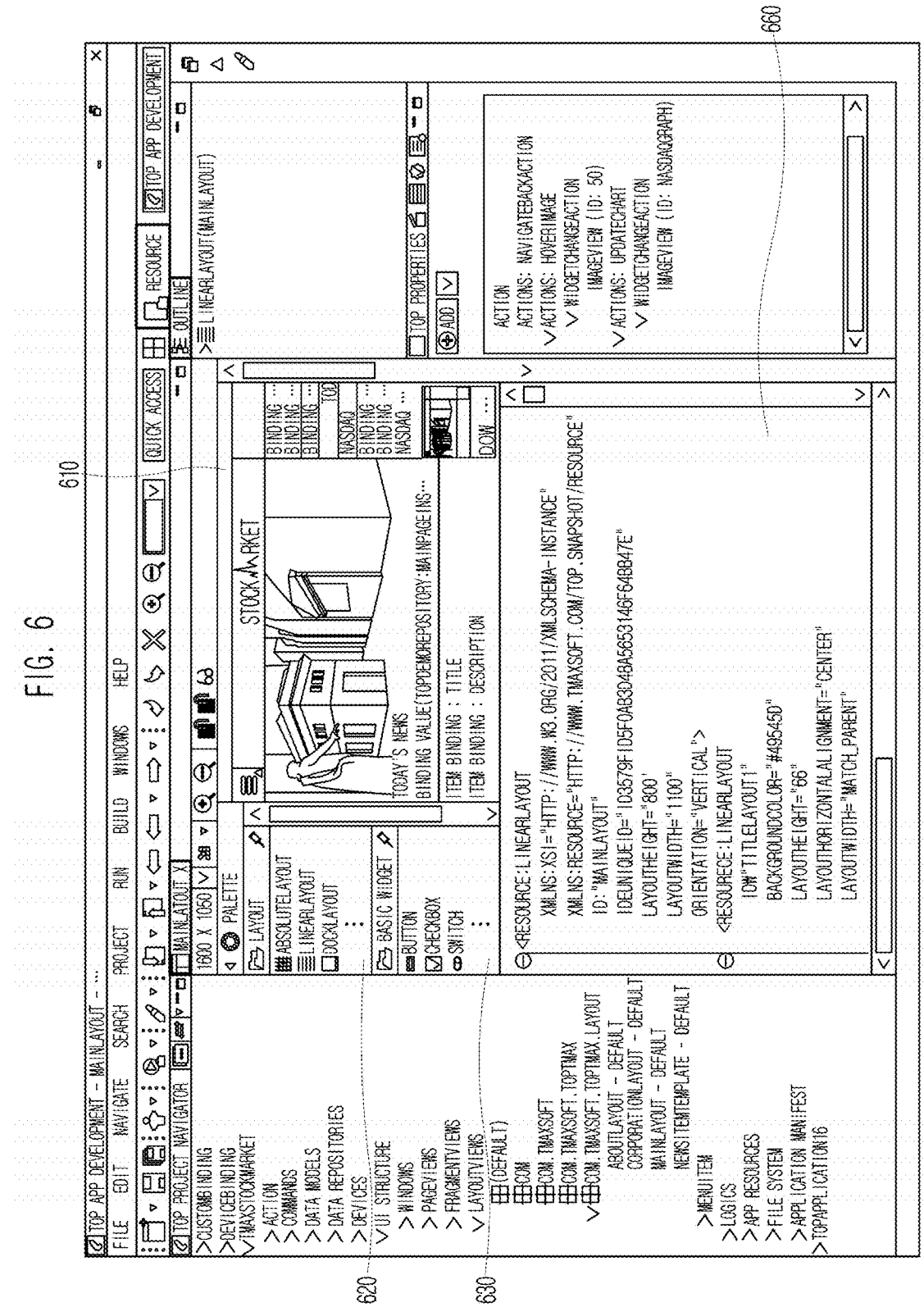
FIG. 6 is a drawing exemplarily illustrating a graphical user interface environment for supporting UI development of an application in accordance with one example embodiment of the present invention.

Herein, one example embodiment of the UI editing window 210 is shown as a graphical user interface environment in FIG. 6. First of all, a reference no. 610 shows an appearance of whole UI. Besides, a reference no. 620 exemplarily illustrates available layouts in the GUI environment of the present invention and a reference no. 630 exemplarily shows available widgets. In addition, a reference no. 640 shows a structure of a UI model of an application, and a reference no. 650 illustrates information on actions created by the user, i.e., action view. Herein, the action view 650 may show a list of all actions of the application developed by the user and a list of UI changes included in each of the actions. Besides, a reference no. 660 shows information on codes. In this example, codes are expressed and written in a XML format. A reference no. 670 is a button which may be pressed to shift to the action editing mode from a state of the UI editing window. In the GUI environment, a way of detecting an intention of the user to start editing an action will not be limited to such interaction as through the button.

Figure 7:
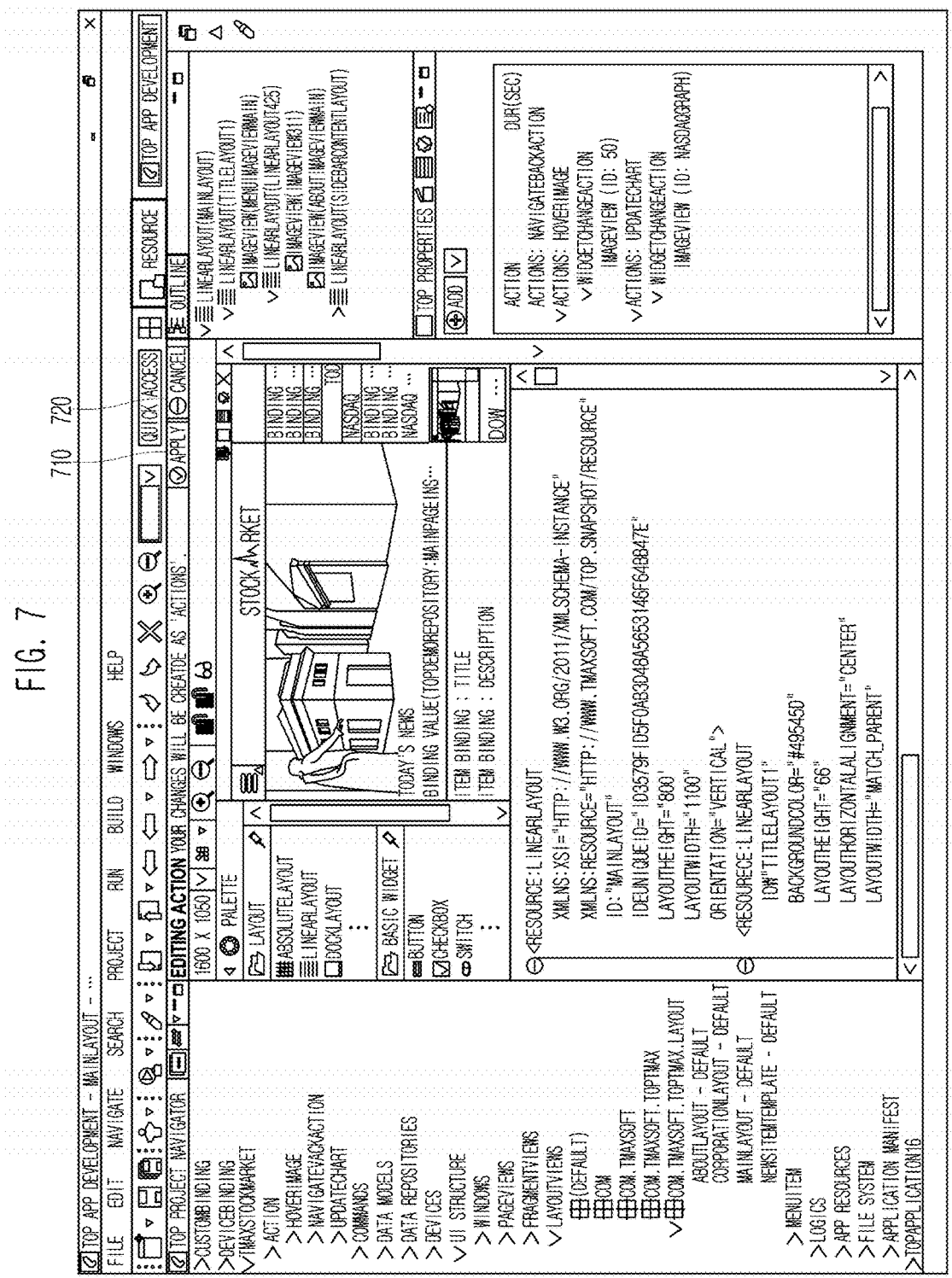
FIG. 7 is a drawing exemplarily illustrating a graphical user interface environment under an action-editing mode in which a user may edit an action with the method for supporting UI development of an application in accordance with one example embodiment of the present invention.

In addition, one example embodiment of the action editing mode 210' is provided by the GUI environment as shown in FIG. 7. In this mode, a reference no. 710 is a button that may be pressed to finish the action editing mode. In the GUI environment, a way of detecting an intention of the user to complete editing the action is not limited only to such interaction as through the button. Certainly, the user may also return the UI model to a previous state by cancelling all editions of the actions by pressing a button whose reference no. is 720 in FIG. 7.

Meanwhile, examples of the actions defined by the method for supporting UI development of the application in accordance with the present invention are as follows:

A first exemplary action relates to changing a color of a button. When a developer, i.e. a user utilizing the method or the server described in the present invention, places the button named A on a screen and intends to make the color of the button A to be changed upon a mouse pointer is hovered over the button, the developer may define the action of changing value of backgroundColor, which is one of attribute values of the button A, to be red. The action may be bound to a mouseover event which is an event triggered when the mouse pointer is hovered over the button.

If the developer intends to apply the defined action to another UI element, the developer may apply the defined action to said another UI element and may make the applied action bind to an event specified by the developer by passing, as a parameter, information on an ID of said another UI element to which UI changes included in the defined action are to be applied.

For example, when the developer intends to change backgroundColor of a button named B to be red, the developer may define ID information of a UI element to which the first exemplary action is to be applied to be passed as a parameter and may reuse the first exemplary action by binding it to the button B.

Further, a secondary exemplary action relates to a creation and a deletion of a new UI element. Upon defining a main screen, the developer may define an action creating a button for signing up new memberships when the developer intends to construct a UI model capable of providing the button for signing up new memberships to a user who may use the application but may have not yet signed in. When the application executes the main screen, program logics of the application may check whether login information for the user exists or not and the program logics may be written to directly call the action if the user has not signed in.

In addition, a third exemplary action relates to changes on position of UI elements. If a user intends to change arrangement or order of the UI elements by using input values, the user may define the change in arrangement or order of the UI elements as an action and then use the defined action.

For a reference, it is to be appreciated that the first to the third exemplary actions set forth above are merely a few examples and that a variety of exemplary actions other than these examples may be introduced.

Individual steps of the method for supporting UI development of the application in accordance with the present invention are to be described below.

Figure 4:
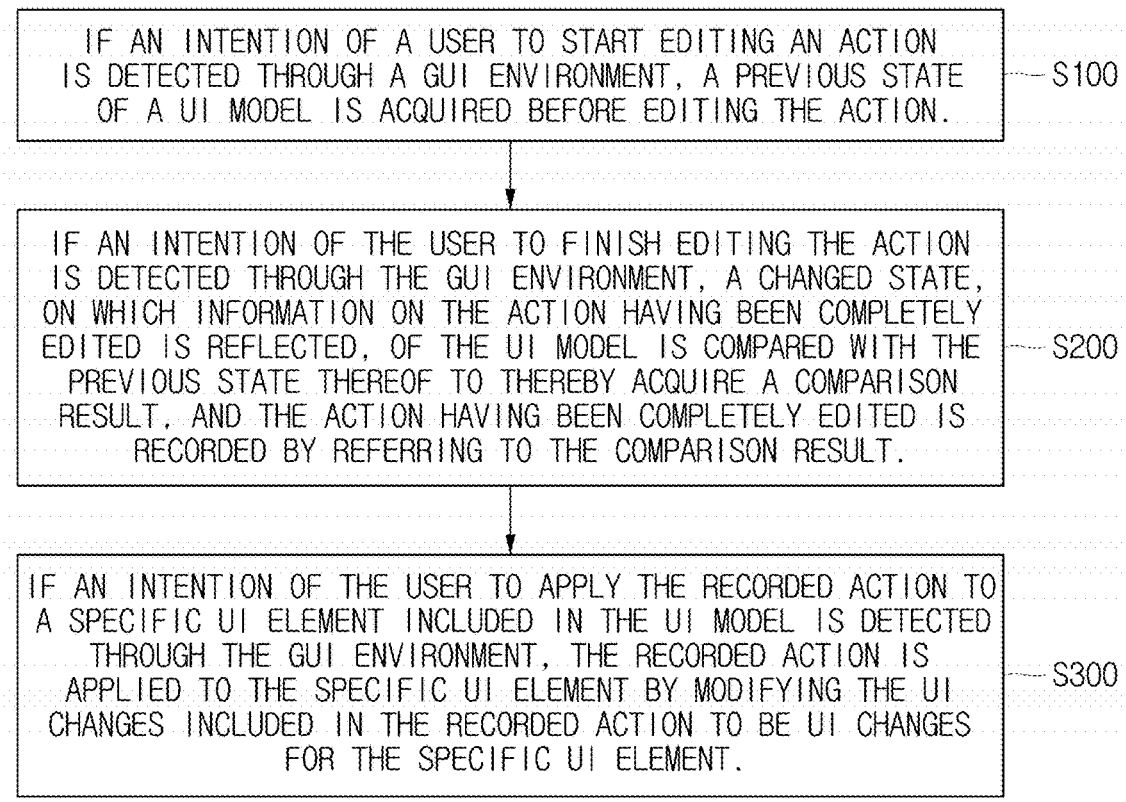
FIG. 4 is a flowchart exemplarily illustrating the method for supporting UI development of the application in the graphical user interface environment in accordance with one example embodiment of the present invention.

FIG. 4 is a flowchart exemplarily illustrating the method for supporting UI development of the application in the GUI environment in accordance with one example embodiment of the present invention.

Referring to FIG. 4, the method for supporting UI development of the application in accordance with a first example embodiment of the present invention includes a step S100 of the server 100, if an intention of a user to start editing an action is detected through the GUI environment provided to a developer's terminal, acquiring or supporting another device to acquire a previous state of a UI model of the application, where the previous state is a state before editing the action.

Moreover, the method for supporting UI development of the application further includes a step S200 of the server 100, if an intention of the user to finish editing the action is detected through the GUI environment, comparing or supporting another device to compare a changed state of the UI model with the previous state thereof to thereby acquire a comparison result, and then recording or supporting another device to record an action having been completely edited by referring to the comparison result. Herein, information on the action having been completely edited is reflected on the previous state of the UI model to thereby acquire the changed state thereof. More preferably, the recorded action may further include information on an identifier for identifying a specific UI element.

At the step S200, detailed description on a procedure of comparing the changed state of the UI model with the previous state thereof is as follows:

The UI model is in a form of tree structure as mentioned above. The UI model may be constituted of widgets and layouts, and the layouts may also have one or more widgets and another layout thereunder. Each of the widgets and the layouts has its own attribute value. If searching an identifier of a widget of the changed state of the UI model within the tree structure of the previous state of the UI model is failed, the server 100 determines that the widget has been newly created. Contrarily, if searching an identifier of a widget of the previous state of the UI model within the tree structure of the changed state of the UI model is failed, the server 100 determines that the widget has been deleted. Then, the server 100 creates the actions to record such UI changes. If the identifier of the widget of the changed state of the UI model is found within the tree structure of the previous state of the UI model, the server 100 compares attribute values of the widget of the previous state thereof with those of the widget of the changed state thereof, and then determines that the attribute values of the widget have been changed in case the attribute values are found to be different as a result of the comparison, and creates an action to record such UI changes.

Preferably, the method may further include a step of the server 100 storing or supporting another device to store changing acts of the user for the UI model as a log, which are detected through the GUI environment. In this case, if the intention of the user to finish editing the action is detected through the GUI environment at the step S200, the server 100 may record or support another device to record the action having been completely edited by referring to the comparison result and the log, where the comparison result is acquired by comparing the changed state of the UI model with the previous state thereof and where the information on the action having been completely edited is reflected on the previous state of the UI model to thereby acquire the changed state.

The reason for storing the changing acts of the user and referring the changing acts of the user in order to create an action is that the action may not be defined only by the comparison result set forth above. For example, in case of editing an action related to a layout including widgets sequentially, if orders of the widgets are changed within the layout by moving those widgets, it may be unfeasible to figure out which one of the widgets has been moved merely by comparing two states of the UI model. In detail, if buttons A, B, and C are initially placed in a sequential order in the layout, and if the user moves the button B after the button C, i.e., next to the button C away from the button A, it may be unfeasible to figure out whether the user has moved the button B after the button C or moved the button C before the button B by simply comparing the buttons placed in an order of A, B, and C with those placed in an order of A, C, and B. Accordingly, while the user is editing an action, the changing acts of the user may be stored as a log to distinguish the above-mentioned changes between the two states. The server 100 may figure out that positions of the buttons B and C have been adjusted by comparing the two states of the UI model; and then, since the log includes information on a fact that the user has moved the button B, the server 100 may figure out whether the user has moved the button B or the button C after checking the log. Hence, a user-intended action may be accurately defined.

Referring to FIG. 4 again, the method for supporting UI development of the application in accordance with the first example embodiment of the present invention may further include a step S300 of the server 100, if an intention of the user to apply the recorded action to a specific UI element included in the UI model is detected through the GUI environment, applying or supporting another device to apply the recorded action to the specific UI element by modifying UI changes included in the recorded action to be UI changes for the specific UI element. That is, the user may be capable of reusing an action created for a UI element for another UI element at the step S300. Preferably, at the step S300, if each of the UI changes included in the recorded action corresponds to each of changes in the attribute values and if the attribute values relate to the specific UI element, the server 100 may apply or support another device to apply each of the UI changes to the specific UI element.

Figure 5:
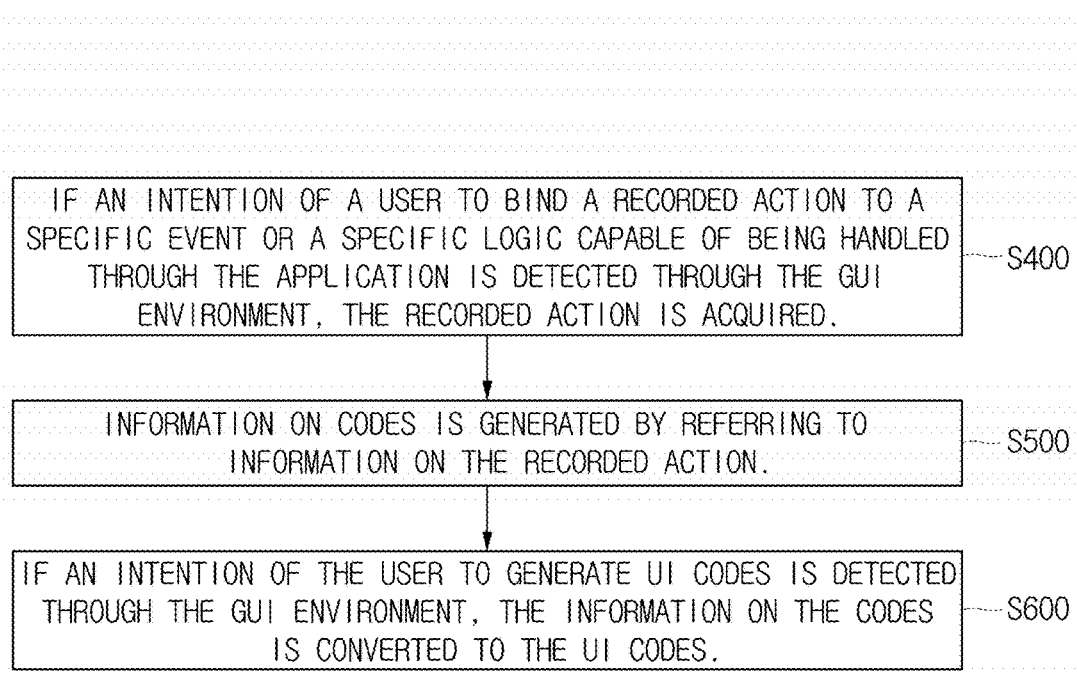
FIG. 5 is a flowchart exemplarily showing the method for supporting UI development of the application in the graphical user interface environment in accordance with another example embodiment of the present invention.

Next, FIG. 5 is a flowchart exemplarily showing the method for supporting UI development of the application in the graphical user interface environment in accordance with a second example embodiment of the present invention.

Referring to FIG. 5, on the condition that the action has been recorded as mentioned in the first example embodiment, if an intention of the user to bind the recorded action to a specific event or a specific logic capable of being handled through the application is detected through the GUI environment, the method for supporting UI development of the application in accordance with the second example embodiment of the present invention may include a step S400 of the server 100 acquiring or supporting another device to acquire the recorded action, and a step S500 of the server 100 generating or supporting another device to generate information on codes which implement the functions of the UI model by referring to information on the recorded action. Herein, the information on the codes generated may be written in an XML format and may be also written in other markup languages such as SGML, HTML, XHTML, SVG, MathML, MXML, XAML, TEX, LATEX, PTEX, JSON, and SAMI etc., but it is not limited thereto.

Preferably, at the step S400, the server 100 may further acquire or support another device to acquire information on an identifier for identifying a specific UI element to which the UI changes included in the recorded action are to be applied, and at the step S500, the server 100 may generate or support another device to generate the information on the codes by referring to the information on the identifier and the recorded action.

As the case may be, the application may further include a library which is a module implementing the functions of the UI model by referring to the information on the codes. Typically, the library may be composed of a module for reading information in an XML format, and a module for handling UI elements based on the information in the XML format.

Referring to FIG. 5 again, the method for supporting UI development of the application in accordance with the second example embodiment of the present invention may further include a step S600 of the server 100, if an intention of the user to generate UI codes which are program codes for implementing the functionalities of the UI model of the application is detected through the GUI environment, converting or supporting another device to convert the information on the codes created at the step S500 to UI codes of a programming language. In this case, the application may be built by inserting the converted UI codes into overall codes.

Figure 8:
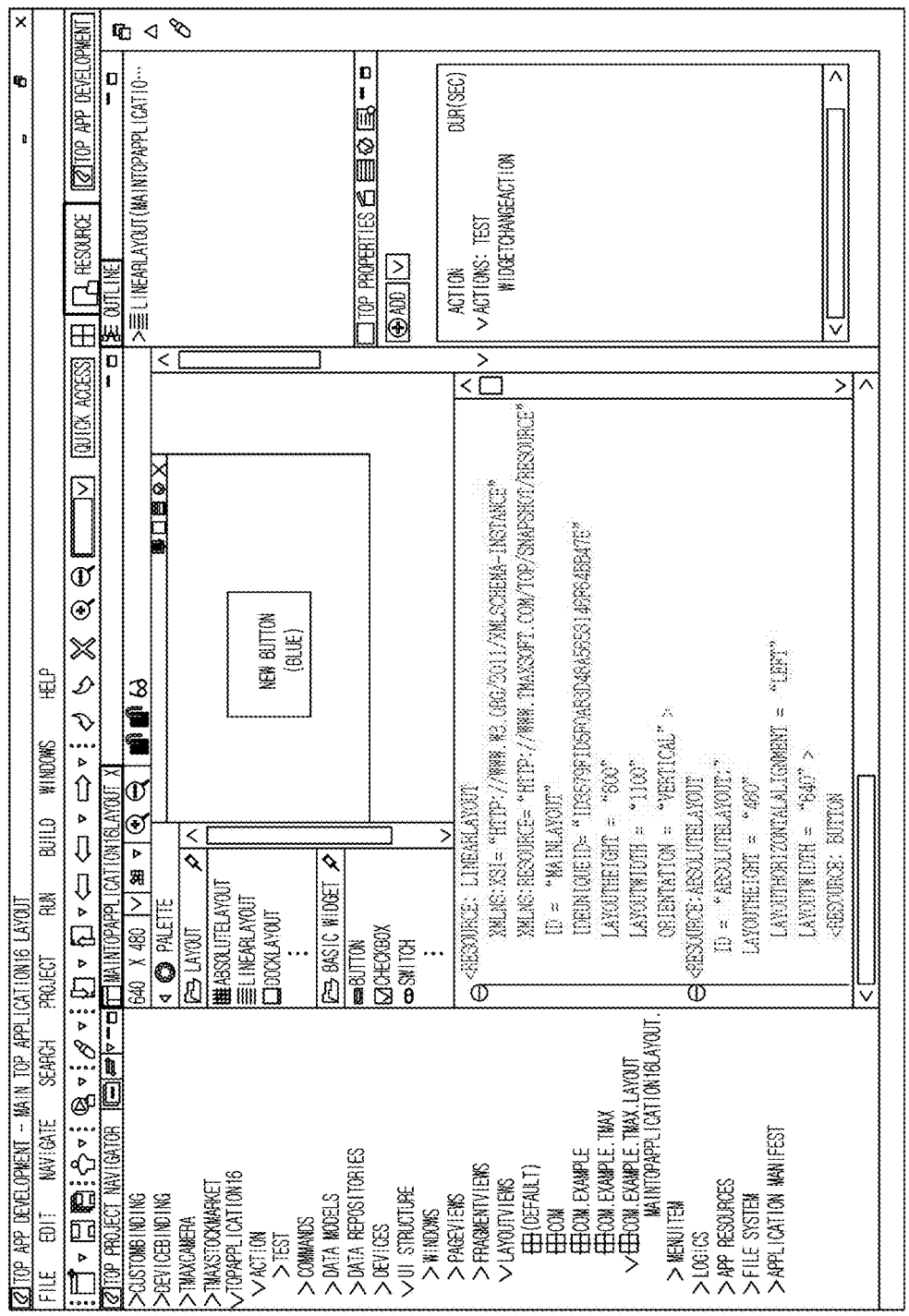
FIGS. 8 to 12 are drawings exemplarily illustrating a procedure of defining an action by using the method for supporting UI development of the application in accordance with one example embodiment of the present invention.

Finally, the procedure of editing and defining the first exemplary action described above may be described by referring to FIGS. 8 to 12 as follows:

First of all, FIG. 8 is a drawing illustrating a state that one button, which is one of widgets, is created in the UI editing window by a user. Meanwhile, if the user intends to generate an action for changing color of the button, the user may press the button whose reference no. is, e.g., 670 to execute the action editing mode. As another example, the user may execute the action editing mode by double-clicking on a title of the action in the action view 650.

Figure 9:
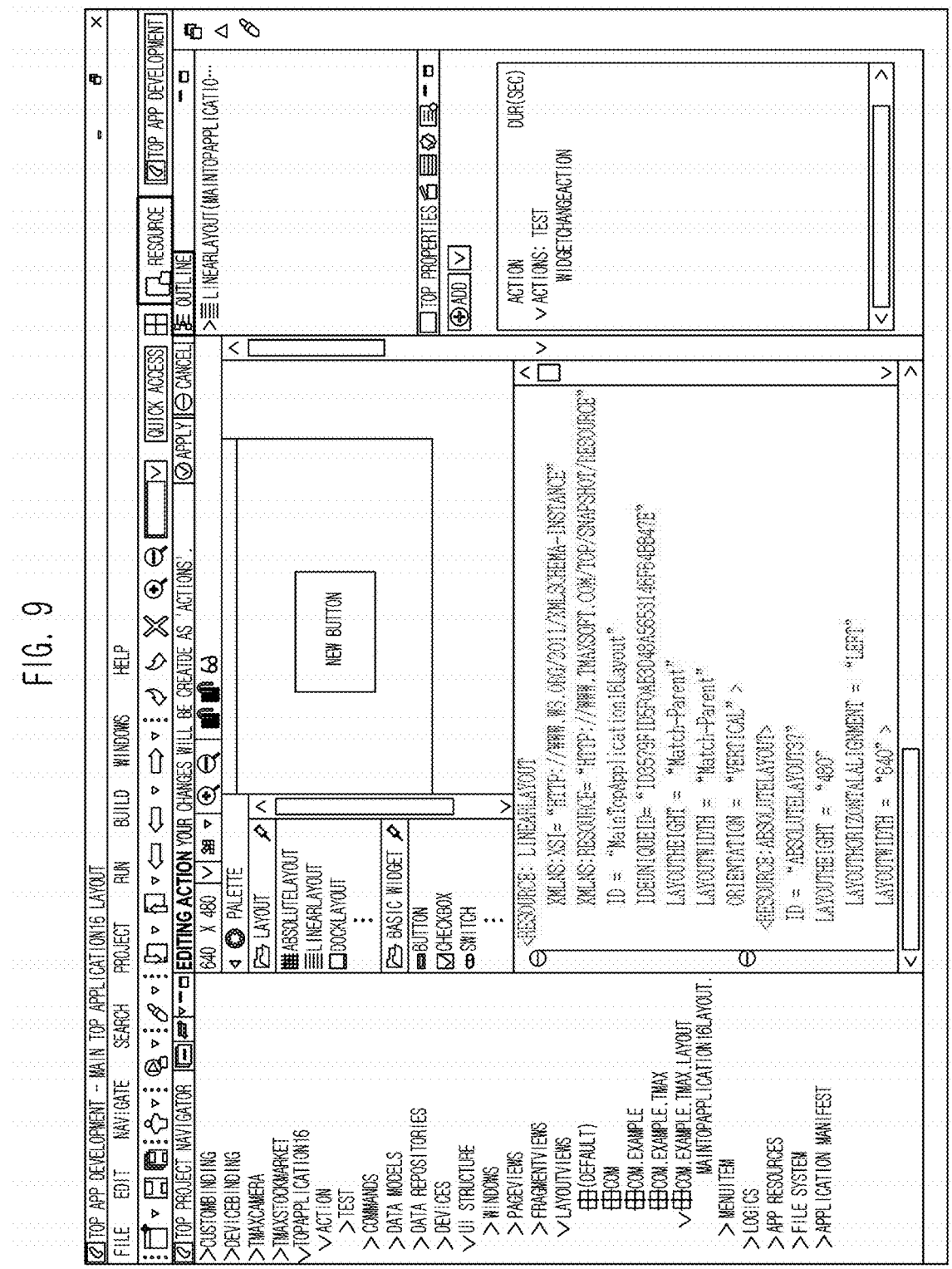

Next, FIG. 9 is a drawing illustrating a state that the user is executing the action editing mode. At this state, the user may intend to change a color of the button.

Figure 10:
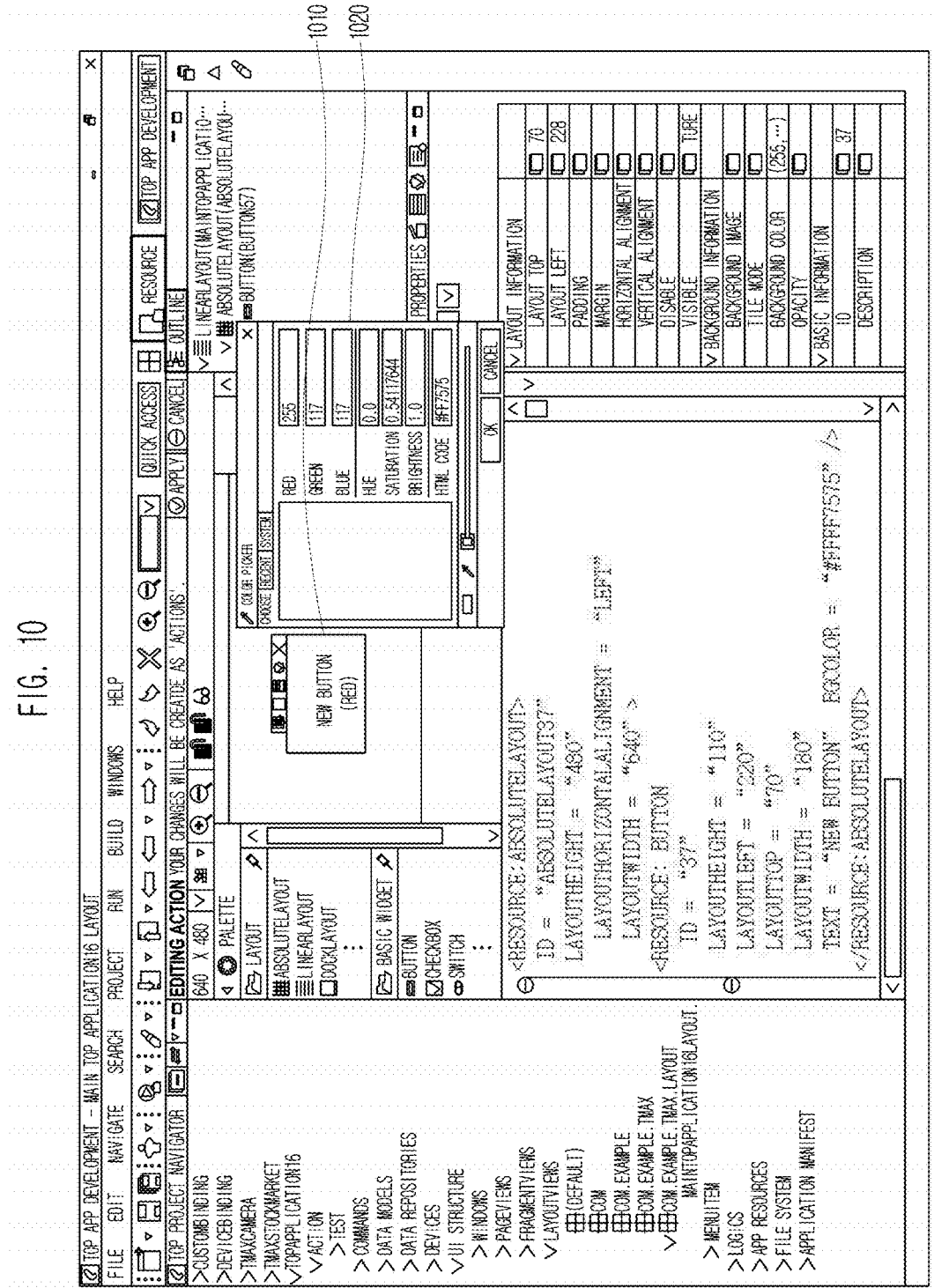

In FIG. 10, the user may change the color, i.e., an attribute value of background color, of the button 1010 by using a color picker 1020 and then may press a button named APPLY.

Figure 11:
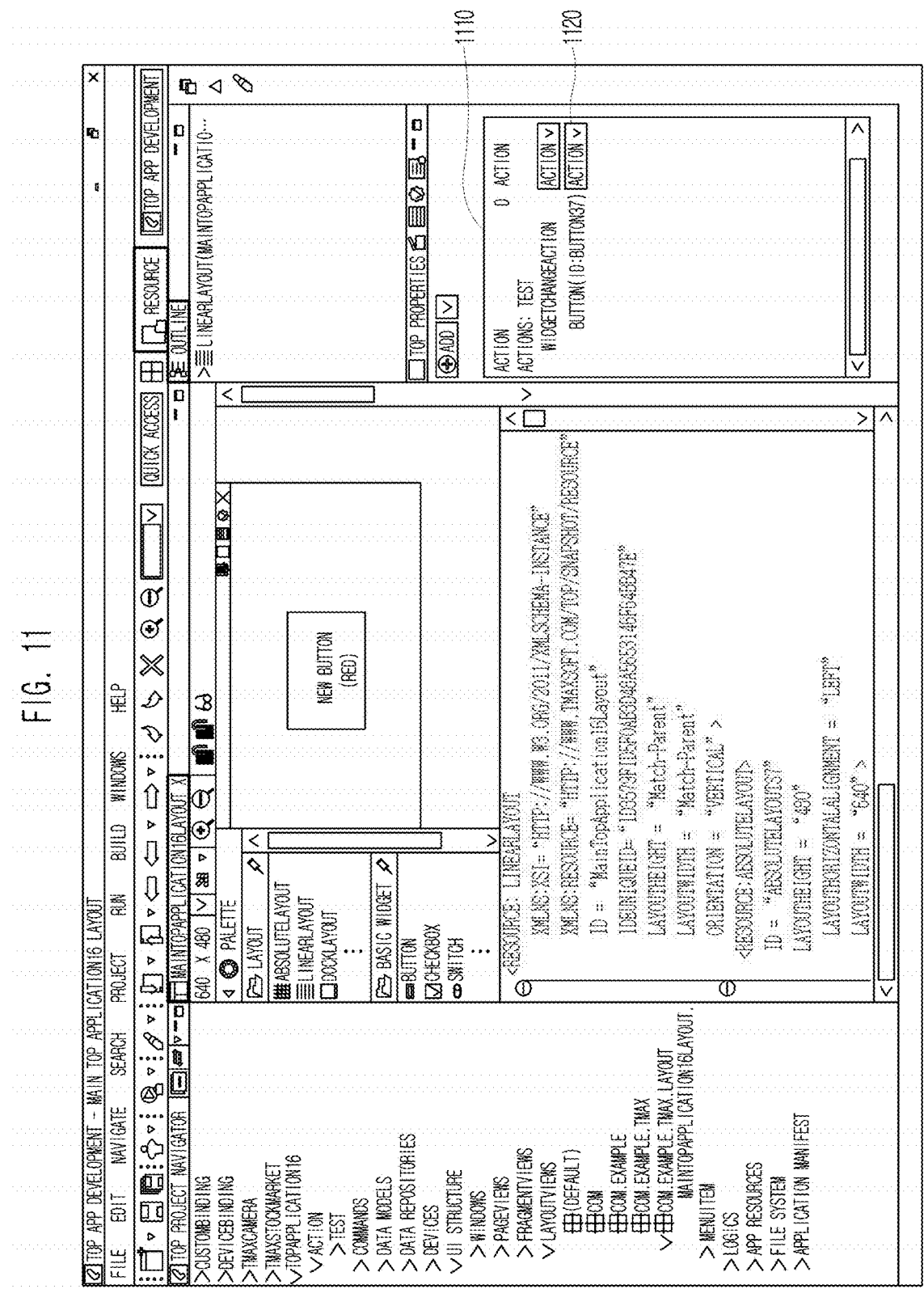

Then, the user may confirm that information on a change of the color of the button has been additionally recorded as a sub-hierarchy of the action through the action view 1110 on the right bottom of FIG. 11. Herein, a reference no. 1120 is a button for binding the action with the sub-hierarchy to a specific event or a specific logic.

Figure 12:
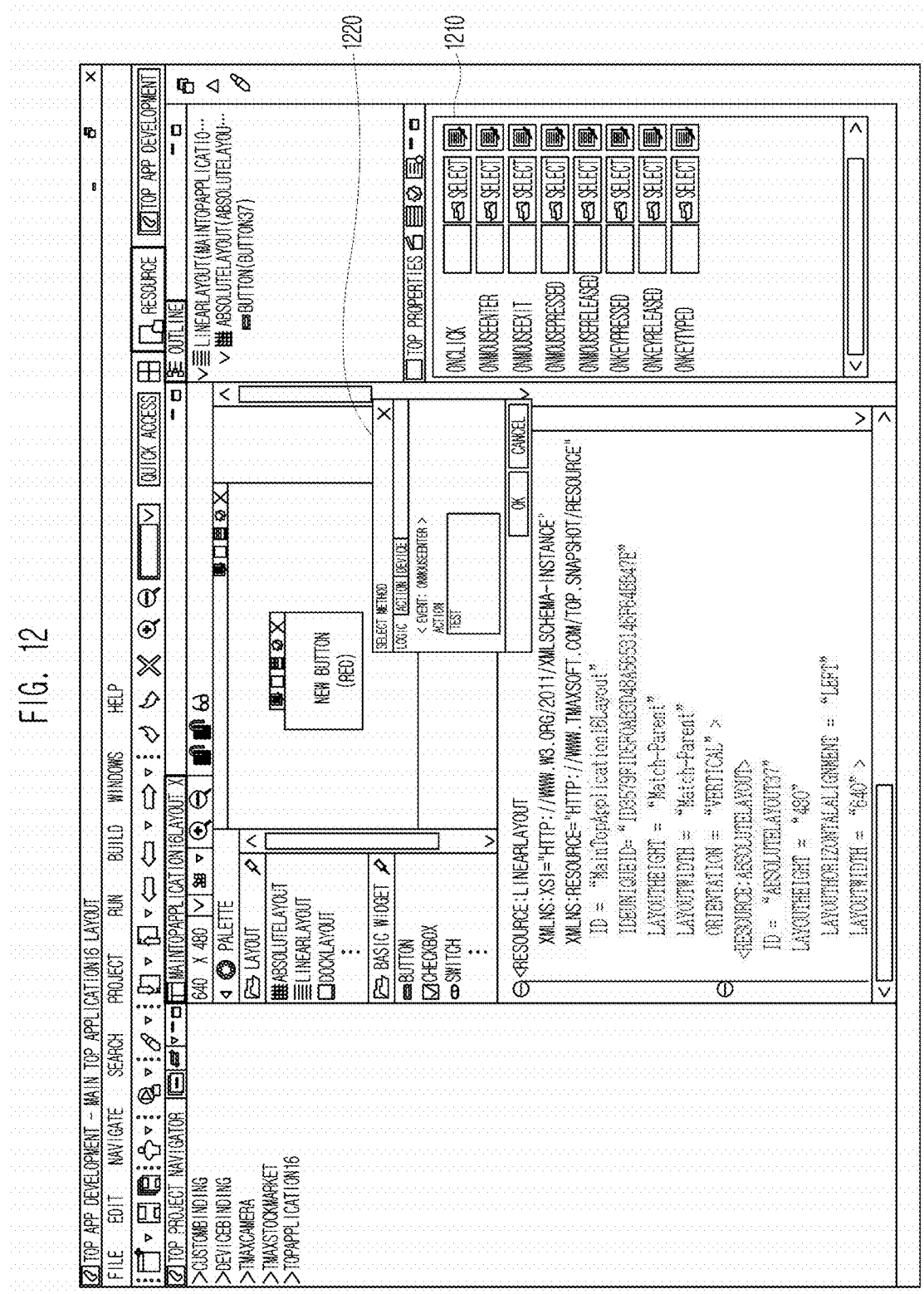
Figure 13:
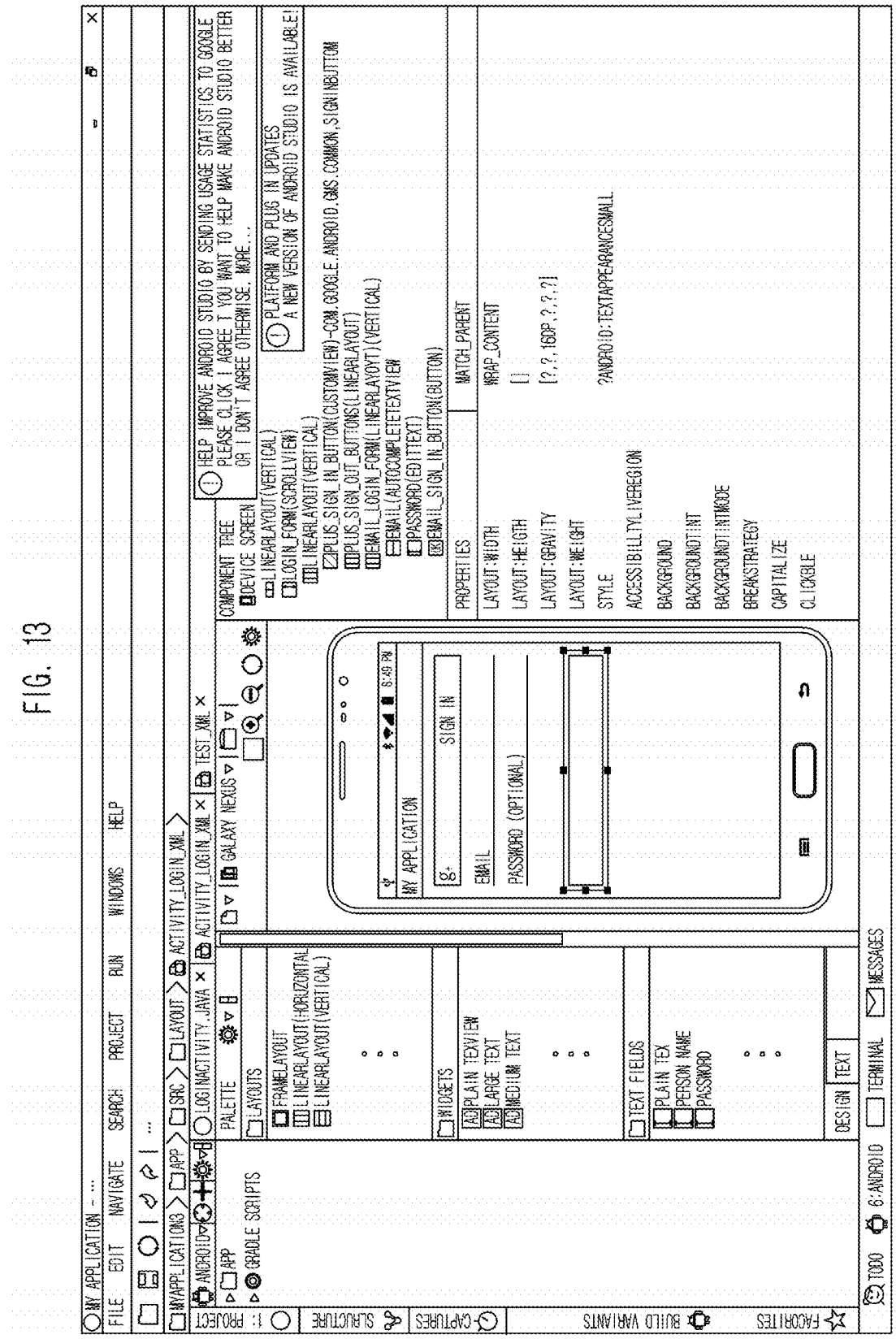
FIG. 13 is a drawing exemplarily illustrating a conventional graphical user interface environment for UI development of an application.

Herein, if the user selects the action by pressing the button, a window 1220, i.e. a binding window 1220, for binding an event or logic may pop up as illustrated in FIG. 12. In a reference no. 1210, a list of events that may be bound to the selected action is displayed. The user may bind a defined event or a written logic to the selected action through the binding window.

In accordance with the present invention, the procedure of editing an action and binding it to an event or a logic is shown as above. Certainly, detailed appearance or characteristics of the graphical user interface environment represented in the examples should not be interpreted as limiting the scope of the thoughts or ideas of the present invention.

Overall, the example embodiments described above provide an effect of reducing time, efforts and costs in developing the application by allowing the developer to define functions of the UI model such as changing the UI model easily during runtime without committing an action of complicated coding.

Herein, advantages of techniques for the aforementioned example embodiments described above are to increase effectiveness of application development because actions already defined may be reused within the same development procedure or a subsequent development procedure, and to provide flexibility for a way of configuring UI function of the application.

The present invention has an effect of easing the development of the whole UI model composed of the UI elements even though the developers are not familiar with API functions which handle the individual UI elements.

In addition, the present invention has an effect of increasing effectiveness of the application development due to the fact that the whole appearance and the functions of the UI model may be defined as information on codes in the XML format and that the information on the codes and the actions may be reused within the same development procedure or the subsequent development procedure.

Besides, the present invention has an effect of providing flexibility for a way of configuring UIs of the application due to the fact that the present invention may apply to both of the following cases: (i) the application configures UI by reading information on the codes in the XML format and (ii) the application compiles UI codes which are programming language codes created through the information on the codes.

Based on description on the aforementioned example embodiments, those skilled in the pertinent art may clearly understand that the present invention may be achieved through a combination of software and/or hardware. The objects of the technical solution of the present invention or parts contributing to the prior art may be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may include a memory such as ROM and RAM to store program commands, a processor such as CPU or GPU composed to execute commands stored in the memory, and a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for supporting development of a user interface (UI) of an application in a graphical user interface (GUI) developer environment, wherein a UI model includes at least one first UI element and the at least one first UI element is at least part of widgets or layouts, the method comprising steps of:

(a) acquiring, by a server in response to detecting an intention of a user to start editing an action through the GUI developer environment, a previous state of the UI model, wherein the action is a set of UI changes to the UI model, and wherein the previous state is a state of the UI model before editing the action; and (b-i) comparing, by the server in response to detecting an intention of the user to finish editing the action through the GUI developer environment, a changed state of the UI model with the previous state thereof to thereby acquire a comparison result, wherein information on the action having been completely edited is reflected on the previous state of the UI model to thereby acquire the changed state thereof, and wherein the changed state of the UI model includes the set of UI changes of the action, wherein the set of UI changes of the action includes a creation or a deletion of the at least one first UI element and changes of attribute values thereof;

(b-ii) recording, by the server, the action by referring to the comparison result to thereby modularize the set of UI changes of the action for reuse;

(c) applying, by the server in response to an intention of the user, the recorded action to a second UI element by making the set of UI changes of the recorded action to the second UI element, thereby reusing the set of UI changes.

2. The method of claim 1, further comprising a step of: storing or instructing other device to store, as a log, acts of the user changing the UI model detected through the GUI developer environment, wherein, at the step of (b-ii), in response to detecting an intention of the user to finish editing the action through the GUI developer environment, the server records or instructs another device to record the action having been edited by referring to the comparison result and the log.

3. The method of claim 1, wherein the recorded action further includes information on an identifier for identifying the specific UI element to which the UI changes included in the recorded action are going to be applied.

4. The method of claim 1, wherein, at the step of (c), when, for each of the UI changes included in the recorded action, each of the UI changes corresponds to each of changes in the attribute values and the attribute values are related to the specific UI element, the server applies each of the UI changes to the specific UI element.

5. The method of claim 1, wherein types of the layouts include at least one of the following:

AbsoluteLayout which is a layout where a position of each of the widgets is determined from upper left of the layout by layoutTop and layoutLeft which are individual attribute values of the widgets included in the layouts;

LinearLayout which is a layout where each of the widgets included in the layouts is placed in an order of top to bottom or left to right according to an orientation being an attribute value of the layout;

DockLayout which is a layout where each of the widgets is arranged with respect to top, left, right, bottom, or center of the layout according to such values as top, left, right, bottom and center acceptable as an attribute value for each of the widgets included in the layouts by layoutAlignParent;

GridLayout which is a layout in which the layout is divided into a pattern of checkerboard by attribute values, row and column, of the layouts and where each of the widgets included in the layouts is placed on a selected position in the checkerboard pattern according to attribute values, layoutRow and layoutColumn, of each of the widgets;

FrameLayout which is a layout where each of the widgets included in the layouts is placed to be overlapped in a predetermined order;

TabLayout which is a layout including at least one tab on the top of the layout and in which each of the widgets is disposed in the layout if the at least one tab corresponding to attribute value layoutTabName of each of the widgets included in the layouts is pressed;

ScrollLayout which is a layout displaying a scroll bar if a total dimension summed up by a dimension of each of the widgets included in the layouts is larger than a dimension of the layout; and ConditionalLayout which is a layout in which each of the widgets is displayed in the layout according to information on corresponding order, where the information on corresponding order is a result value of a function binding to layoutSwitchCase which is an attribute value of each of the widgets included in the layouts.

6. A method for supporting development of a user interface (UI) of an application in a graphical user interface (GUI) developer environment, wherein a UI model includes at least one first UI element and the at least one first UI element is at least part of widgets or layouts, the method comprising steps of:

(a-i) acquiring, by a server, a previous state of the UI model, wherein the previous state is a state of the UI model before editing an action, wherein the action is a set of UI changes to the UI model, and wherein the UI changes include creation or deletion of the at least one first UI element and changes of attribute values thereof;

(a-ii) comparing, by the server in response to detecting an intention of a user to finish editing the action through the GUI developer environment, a changed state of the UI model with the previous state thereof to thereby acquire a comparison result, wherein information on the action having been completely edited is reflected on the previous state of the UI model to thereby acquire the changed state thereof;

(a-iii) recording, by the server, the information on the action having been completely edited by referring to the comparison result to thereby modularize the set of UI changes of the action for reuse;

(a-iv) acquiring, by the server in response to detecting through the GUI developer environment an intention of the user to bind the recorded action to a specific event or a specific logic capable of being handled through the application, the recorded action; and (b) generating, by the server, information on codes by referring to information on the recorded action, wherein the information on codes is information used for implementing functions of the UI model.

7. The method of claim 6, further comprising a step of (a-v) acquiring, by the server, information on an identifier for identifying a specific UI element to which the UI changes included in the recorded action are going to be applied, and wherein, at the step of (b), the server generates the information on the codes by referring to the information on the identifier and the recorded action.

8. The method of claim 6, further comprising a step of:

(c) converting, by the server in response to detecting through the GUI developer environment an intention of the user to generate UI codes which are program codes for implementing functions of the UI model of the application, the information on the codes to the UI codes.

9. The method of claim 6, wherein the application further includes a library, wherein the library is a module for implementing the functions of the UI model based on the information on the codes.

10. The method of claim 6, wherein types of the layouts include at least one of the following:

AbsoluteLayout which is a layout where a position of each of the widgets is determined from upper left of the layout by layoutTop and layoutLeft which are individual attribute values of the widgets included in the layouts;

LinearLayout which is a layout where each of the widgets included in the layouts is placed in an order of top to bottom or left to right according to an orientation being an attribute value of the layout;

DockLayout which is a layout where each of the widgets is arranged with respect to top, left, right, bottom, or center of the layout according to such values as top, left, right, bottom and center acceptable as an attribute value for each of the widgets included in the layouts by layoutAlignParent;

GridLayout which is a layout in which the layout is divided into a pattern of checkerboard by attribute values, row and column, of the layouts and where each of the widgets included in the layouts is placed on a selected position in the checkerboard pattern according to attribute values, layoutRow and layoutColumn, of each of the widgets;

FrameLayout which is a layout where each of the widgets included in the layouts is placed to be overlapped in a predetermined order;

TabLayout which is a layout including at least one tab on the top of the layout and in which each of the widgets is disposed in the layout if the at least one tab corresponding to attribute value layoutTabName of each of the widgets included in the layouts is pressed;

ScrollLayout which is a layout displaying a scroll bar if a total dimension summed up by a dimension of each of the widgets included in the layouts is larger than a dimension of the layout; and ConditionalLayout which is a layout in which each of the widgets is displayed in the layout according to information on corresponding order, where the information on corresponding order is a result value of a function binding to layoutSwitchCase which is an attribute value of each of the widgets included in the layouts.

11. A server for supporting development of a user interface (UI) of an application in a graphical user interface (GUI) developer environment, wherein a UI model includes at least one first UI element and the at least one first UI element is at least part of widgets or layouts, the server comprising:

a communication part for detecting an intention of a user to start editing an action through the GUI developer environment, wherein the action is a set of UI changes to the UI model; and a processor for:
(i) acquiring a previous state of the UI model, wherein the previous state is a state of the UI model before editing the action;
(ii) comparing, in response to detecting through the GUI developer environment an intention of the user to finish editing the action, a changed state of the UI model with the previous state thereof to thereby acquire a comparison result, wherein information on the action having been completely edited is reflected on the previous state of the UI model to thereby acquire the changed state thereof, and wherein the changed state of the UI model includes the set of UI changes of the action, wherein the set of UI changes of the action includes a creation or a deletion of the at least one first UI element and changes of attribute values thereof; and
(iii) recording the action by referring to the comparison result to thereby modularize the set of UI changes of the action for reuse; and
(iv) applying, in response to detecting through the GUI developer environment an intention of the user, the recorded action to a second UI element by making the set of UI changes of the recorded action to the second UI element, thereby reusing the set of UI changes.

12. The server of claim 11, wherein the processor stores or instructs another device to store, as a log, acts of the user changing the UI model detected through the GUI developer environment, and in response to detecting an intention of the user to finish editing the action through the GUI developer environment, the processor records or instructs another device to record the action having been edited by referring to the comparison result and the log.

13. The server of claim 11, wherein the recorded action further includes information on an identifier for identifying the specific UI element to which the UI changes included in the recorded action are going to be applied.

14. The server of claim 11, wherein, when, for each of the UI changes included in the recorded action, each of the UI changes corresponds to each of changes in the attribute values and the attribute values are related to the specific UI element, the processor applies or instructs another device to apply each of the UI changes to the specific UI element.

15. A server for supporting development of a user interface (UI) of an application in a graphical user interface (GUI) developer environment, wherein a UI model includes at least one first UI element and the at least one first UI element is at least part of widgets or layouts, the server comprising:

a communication part for:
(i) acquiring a previous state of the UI model, wherein the previous state is a state of the UI model before editing an action, wherein the action is a set of UI changes to the UI model, and wherein the UI changes include creation or deletion of the at least one first UI element and changes of attribute values thereof;
(ii) comparing, in response to detecting an intention of a user to finish editing the action through the GUI developer environment, a changed state of the UI model with the previous state thereof to thereby acquire a comparison result, wherein information on the action having been completely edited is reflected on the previous state of the UI model to thereby acquire the changed state thereof;
(iii) recording the information on the action having been completely edited by referring to the comparison result to thereby modularize the set of UI changes of the action for reuse; and
(iv) detecting through the GUI developer environment an intention of the user to bind the recorded action to a specific event or a specific logic capable of being handled through the application; and
a processor for acquiring the recorded action and generating information on codes by referring to information on the recorded action, wherein the information on codes is information used for implementing functions of the UI model.

16. The server of claim 15, wherein the processor further acquires information on an identifier for identifying a specific UI element to which the UI changes included in the recorded action are going to be applied and generates the information on the codes by referring to the information on the identifier and the recorded action.

17. The server of claim 15, wherein, in response to detecting through the GUI developer environment an intention of the user to generate UI codes which are program codes for implementing functions of the UI model of the application, the processor converts the information on the codes to the UI codes.

18. The server of claim 15, wherein the application further includes a library, wherein the library is a module for implementing the functions of the UI model based on the information on the codes.

* * * * *